United States Patent [19]

Knippa, Jr. et al.

[11] 3,718,707

[45] Feb. 27, 1973

[54] OXIDATIVE DEHYDROGENATION

[75] Inventors: James A. Knippa, Jr.; Andrew K. Schwartz, Jr., both of Houston, Tex.

[73] Assignee: Petro-Tex Chemical Corporation, Houston, Tex.

[22] Filed: Feb. 19, 1971

[21] Appl. No.: 117,129

[52] U.S. Cl............260/678, 260/680 D, 260/683.3
[51] Int. Cl............................C07c 5/18, C07c 11/30
[58] Field of Search ....260/678, 680 D, 683.3, 680 E

[56] References Cited

UNITED STATES PATENTS

| | | |
|---|---|---|
| 3,210,436 | 10/1965 | Bajars et al...........................260/680 |
| 3,308,188 | 3/1967 | Bajars...................................260/680 |
| 3,308,191 | 3/1967 | Bajars...................................260/680 |
| 3,205,280 | 9/1965 | Wattimena et al. .................260/680 |
| 3,642,930 | 2/1972 | Grasselli et al......................260/680 |
| 3,666,687 | 5/1972 | Croce et al. ......................260/680 X |

*Primary Examiner*—Paul M. Coughlan, Jr.
*Attorney*—G. Baxter Dunaway

[57] ABSTRACT

Oxidative dehydrogenation of hydrocarbons using oxygen and halogen and a catalyst of $FeA_xMo_y$ with $x$ being from 0.01 to 0.5 and $y$ being from 0.001 to 0.1 and A being calcium, magnesium, strontium, barium or mixtures. n-Butane is dehydrogenated to a mixture of butadiene-1,3 and vinyl acetylene using a catalyst containing Fe, Mg, Ca and Mo.

7 Claims, No Drawings

OXIDATIVE DEHYDROGENATION

It is an object of this invention to provide a process for the preparation of unsaturated hydrocarbons preferably containing triple bonds. Aliphatic compounds containing triple bonds such as vinyl acetylene are used in large quantities. One of the principal uses of vinyl acetylene is as a starting material for the preparation of chloroprene by the addition of hydrochloric acid to vinyl acetylene. Vinyl acetylene is produced commercially by passing acetylene through a hydrochloric acid solution of cuprous chloride. The gas from the reactor must then be initially condensed to remove water, and thereafter the gas is dried by content with a drying agent, this drying step is then followed by a second condensation step and a fractionation step to separate the vinyl acetylene product. A more economical and straightforward process for the preparation of vinyl acetylene has been needed. It is also an object to produce other hydrocarbons containing double or triple bonds.

Another object of this invention is to produce hydrocarbons containing one or more double bonds such as butadiene or isoprene concurrently with the production of the hydrocarbons containing the triple bonds. Butadiene is commercially produced at relatively low yields in the process of dehydrogenation of butane by the Houdry process. Several processes have been proposed for the preparation of isoprene. Isoprene has been produced by the condensation of isobutylene with two molecules of formaldehyde followed by decomposition of the condensed molecule to produce isoprene, by condensation of formaldehyde with methyl ethyl ketone followed by hydrogenation to the glycol and dehydration of the glycol to isoprene, and similarly acetone has been condensed with acetylene and the product hydrogenated to produce an alcohol which is then dehydrated to isoprene, also propylene is dimerized to a six carbon molecule which is then isomerized and cracked to isoprene. While some of these processes are commercial, it is an object of this invention to provide more straightforward and improved processes for the preparation of these and other hydrocarbons especially aliphatic hydrocarbons containing from four to six carbon atoms.

According to this invention it has been discovered that hydrocarbons may be dehydrogenated to produce unsaturated hydrocarbons preferably at least one triple bond is produced concurrently with hydrocarbons containing at least one double bond. Thus, for example, both vinyl acetylene and butadiene-1,3 can be produced from n-butane, n-butene or mixtures. These and other objects may be achieved by reacting at an elevated temperature a hydrocarbon together with both oxygen and a halogen in the presence of certain catalysts.

These and other objects may be achieved by a process for the oxidative dehydrogenation of hydrocarbons containing at least two adjacent carbon atoms neither of which is a tertiary carbon atom which comprises reacting said hydrocarbon with oxygen and a halogen in the presence of a catalyst comprising $FeA_x\text{-}Mo_y$, wherein $x$ is from 0.01 to 0.5, $y$ is from 0.001 to 0.1 with A being selected from the group consisting of calcium, magnesium strontium, barium or mixtures thereof.

The invention is suitably carried out by passing the hydrocarbon feed with at least 0.005 mol of halogen, calculated as mols of halogen per mol of hydrocarbon feed, and at least one-fourth mol of oxygen per mol of hydrocarbon feed at an elevated temperature.

The amount of oxygen used normally will be from about one-fourth mol of oxygen per mol of hydrocarbon feed to about 2 mols or more of oxygen per mol of hydrocarbon feed. Optimum selectivity has been obtained when amounts of oxygen from about 0.30 or 0.6 to about 1.5 mol of oxygen per mol of hydrocarbon feed are employed. High conversions have been obtained when the amount of oxygen was varied from about 0.075 to about 1.75 mols of oxygen per mol of hydrocarbon feed. Economic and operational considerations will dictate the exact molar ratio of oxygen to hydrocarbon feed to be used. A particularly useful range is from about 0.5 to 1.5 mols of oxygen per mol of hydrocarbon feed. Oxygen may be supplied to the system as pure oxygen, or oxygen diluted with inert gases such as helium, carbon dioxide, or nitrogen. Oxygen may be supplied as air or as air enriched with oxygen. In relation to halogen, the amount of oxygen employed should be greater than 1.25 mols of oxygen per atom of halogen and normally will be greater than 1.5 gram mols of oxygen per gram atom of halogen. Usually the ratio of mols of oxygen to atoms of halogen will be from about 2 to 150.

The total halogen concentration normally will be varied from about 0.005 mol to about 0.3 mol of halogen per mol of hydrocarbon. With iodine the best results have been obtained with the total amount of iodine at a concentration from 0.01 to 0.09 mol of iodine per mol of hydrocarbon feed. With bromine alone, it is preferred to employ a concentration of from about 0.05 to 0.2 or 0.3 mol of bromine per mol of hydrocarbon feed, and with chlorine alone it is preferred to use concentrations of about 0.05 to 0.4 mol of chlorine per mol of hydrocarbon feed.

In general, any volatile halogen or halogen compound may be used which under the conditions of reaction will have at least equivalent to 0.005 mol, or 0.010 atoms, of halogen present in the vapor phase per mol of hydrocarbon feed. Halogen compounds which are sufficiently volatile to exert a vapor pressure of at least 1.0 millimeter of mercury and preferably 10 millimeters of mercury at atmospheric pressure and at a temperature of 400° C. have been found to be useful. Halogen compounds which decompose on heating may also be used, although some of these compounds are not preferred because they might leave deposits in the reactor. In the specification and in the claims when reference is made to a certain percentage of the halogen compound being in the vapor state, this is applicable regardless of whether the halogen compound was derived such as by boiling, decomposition or sublimation. It should be understood that when mols of halogen are referred to, both in the specification and in the claims, that this phrase is used as an expression of the quantity of halogen present in the vapor phase and not an expression that the halogen is in molecular or elemental form. Alternatively, the quantity of halogen could be expressed in terms of twice the number of atoms of halogen designated.

The halogen may be fed as elemental halogen or may be introduced by a halogen compound which will liberate halogen atoms at the temperature of reaction. Suitable sources of halogen are the free halides such as elemental iodine or bromine; hydrogen halides such as HI, HCl and HBr; aliphatic halides such as methyl iodine, 1,2-diiodo ethane, 1-bromo-2-chloroethane, ethyl iodide, propyl iodide, butyl iodide, amyl iodide, hexyl iodide, isopropyl iodide, tert-butyl iodide, ethyl bromide, 1-iodo-2-bromoethane and allyl iodide; cyclo aliphatic compounds such as cyclohexyl iodide; aromatic compounds such as 1-2-diiodo benzene, phenyl iodide, and benzyl iodide; halohydrins such as ethylene iodohydrin; halo substituted aliphatic acids such as iodo acetic acid; ammonium halides such as ammonium iodide, ammonium bromide and ammonium chloride; organic amine halide salts of the general formula $R_3N \cdot HX$ wherein X is a halogen, R is a radical containing from zero to eight carbon atoms and is selected from the group consisting of hydrogen, alkyl, aryl, alkaryl, aralkyl and cyclo alkyl radicals and mixtures thereof wherein at least one of the R's is not a hydrogen atom, such as methyl amine hydroiodide. These compounds are only illustrative as no attempt has been made to include all classifications of halogen compounds. Mixtures of two or more halogen compounds may be used to supply the desired amount of halogen to the system. Thus, mixtures of various halogens such as a mixture of iodine and bromine, iodine and chlorine and iodine together with bromine and chlorine are particularly desirable. Mixtures of various compounds of the same halogen may also be used such as mixtures of hydrogen iodide and ammonium iodide or a mixture of elemental iodide, hydrogen iodide and ammonium iodide.

Although a great variety of sources of halogen may be utilized, certain of the sources are preferred. As to the halogens, the preferred halogens are iodine, bromine, and chlorine; either bromine alone or mixtures wherein bromine is mixed with either iodine or chlorine in minor amounts being particularly preferred. The best results have been obtained either by feeding the halogen as elemental bromine or as the hydrogen bromide, ammonium bromide or alkyl bromide containing from one to four carbon atoms.

The active surface or catalyst may be present in the reactor as a fixed bed packing, although these active surfaces may also be present as the reactor walls if a sufficiently small diameter reactor tube is used in order to achieve adequate active surface. The active surfaces may also be brought into contact with the gaseous feed by feeding the active surface either concurrently or countercurrently to the gaseous stream. Of course, when the active surface is in motion, the system may be classified as fluid bed process.

The catalysts of this invention comprise $FeA_xMo_y$ wherein $x$ is from 0.01 to 0.5, $y$ is from 0.001 to 0.1 with A being selected from the group consisting of calcium, magnesium, strontium, barium or mixtures thereof. A preferred catalyst comprises $FeMg_aCa_bMo_y$ wherein $a$ is from 0.02 to 0.5, $b$ is from 0.01 to 0.4 and $y$ is from 0.001 to 0.1 and especially suitable catalysts are those wherein $a$ is from 0.2 to 0.25, $b$ is from 0.05 to 0.08 and $y$ is from 0.003 to 0.03.

In general, any metal, salts, oxides or hydroxides or precursors thereof of Fe, Ca, Mg, Sr, Ba and Mo may be used as starting materials to form the designated catalyst composition. Many of these metals, salts and hydroxides may change during the preparation of the active surface, during heating in a reactor prior to use in the process of this invention, or are converted to another form under the described reaction conditions, but such materials still function as an effective compound in the defined process. Most metals, nitrates, nitrites, carbonates, hydroxides, acetates, sulfites, silicates, sulfides and the like are readily converted to the corresponding oxide under the reaction conditions defined herein. For instance, iron nitrate is converted to the corresponding oxide while being heated in a reactor to a reaction temperature. Such salts as the halides, some carbonates, and hydroxides and the like, of the defined metal groups, which are normally stable at the defined reaction temperatures are likewise effective under the conditions of the described reaction. Particularly effective in the process of this invention are the defined metals and their oxides. In addition, any metal or compound thereof of these groups which are convertible to or are converted under the described reaction conditions to an active catalytic state as the metal oxide or salt thereof are likewise effective in the process of this invention. The metal oxides represent a useful class of materials, since they are inexpensive and are readily formed into pellets or deposited on carriers, and may be readily formed in situ from metals, salts and hydroxides.

Although a great variety of solid catalysts may be used, certain catalysts are preferred. The required metal components will preferably be in the form of oxides. However, as pointed out above the oxides may be formed from decomposable precursors. The components may be present in the form of compounds of the specified elements. For instance, excellent catalysts may be prepared from the ferrite $MgFe_2O_4$ combined with a source of Mo. Similarly, calcium, strontium or barium ferrites may be employed either singly or in mixtures. Ferrites containing more than one of the elements in the crystal are within the scope of the invention e.g. a calcium magnesium ferrite. Various sources of molybdenum may be employed such as any of the molybdenum oxides or salts, however, a preferred source of molybdenum is molybdic acid, $H_2MoO_4 \cdot H_2O$.

In the above descriptions of catalyst compositions, the composition described is that which is exposed to the reaction gases. That is, the composition of the catalyst support, if any, is not included in the described composition. Inert catalyst binding agents or fillers may be used, but these will not ordinarily exceed 50 percent by weight of the composition exposed to the reaction gases.

The solid catalyst may be present as such or may be coated on a variety of supports which may be in any form. The catalyst supports are conveniently composed of aluminas, silica gel, Vycor or other conventional support materials known in the art.

The total pressure on systems employing the process of this invention normally will be at or in excess of atmospheric pressure, although subatmospheric pressure can be used. Conveniently, pressures up to about 100 or 150 psig will be used. Diluent gases may be such as nitrogen, helium, steam or air. The preferred method is to incorporate steam as part of the feed together with air as the source of the oxygen. Steam is particularly advantageous. When steam is employed, the ratio of steam to hydrocarbon feed is normally within the range of about 5 to 40 mols of steam per mol of hydrocarbon feed.

The temperature of reaction, which is the maximum temperature in the reactor, will normally be greater than 600° C. From a commercial standpoint of relative yields of product, temperatures of between about 700° C and 850° C are desirable. Generally, temperatures between about 725° and 925° C or 1,000° C are used. Highest yields of products containing triple bonds are generally obtained at temperatures of at least 700° C.

The flow rates of the gaseous reactants may be varied quite widely and can be readily established by those skilled in the art. Good results have been obtained with hydrocarbon flow rates ranging from about one-fourth to three liquid volumes of hydrocarbon feed per volume of reactor packing per hour (LHSV). The residence or contact time of the reactants in the reaction zone under any given set of reaction conditions depends upon all the factors involved in the reaction such as the type of reactor employed. Contact times ranging from about 0.1 to about 5 to 10 seconds have been found to be satisfactory. However, a wider range of residence times may be employed which may be low as about 0.01 seconds to as long as several minutes, as high as about 3 minutes, although such long reaction times are not preferred. Normally, the shortest contact time consonant with optimum yields and operating conditions is desired. Residence time is the calculated dwell time of the reaction mixture in the reaction zone assuming the mols of product mixture are equivalent to the mols of feed mixture. When the reactor is packed with active surface, that portion of the reactor which is packed with catalyst is considered to be the reaction zone.

The hydrocarbon feed may be compounds containing at least two adjacent carbon atoms neither of which is a tertiary carbon atom with preferred compounds having from two to six carbon atoms. Especially useful are aliphatic hydrocarbon compounds containing from four to six carbon atoms. Suitable feeds are such as the alkanes, alkenes, alkynes, alkadienes, alkenynes, and so forth. Mixtures of feed hydrocarbons may be used. Specific compounds which may be dehydrogenated to hydrocarbons having a greater amount of unsaturation are compounds such as n-butane, n-pentane, 2-methyl butane, n-hexane, 2-methyl pentane, 3-methyl pentane, n-butene-1, n-butene-2, n-pentene-1, n-pentene-2, 1,3-butadiene, 2-methyl-1-butene, and 2,2-dimethyl butane. In the preferred feed hydrocarbons there should be a straight carbon chain of at least four carbons, and there should be no more than one tertiary carbon atom in the feed. The feed hydrocarbons should contain not more than one triple bond. The feed hydrocarbons should contain at least two adjacent carbon atoms neither of which is a tertiary carbon atom and wherein the bond between the adjacent carbon atoms is not a triple bond. In other words, preferably the product should be capable of containing a triple bond where none existed in the feed. A preferred feature of this invention is the production of products containing as a major product compounds containing triple bonds as well as those containing one or two double bonds, and preferably will contain the same number of carbon atoms as the feed material. For example, butane can be dehydrogenated to a mixture of butene, butadiene-1,3 and vinyl acetylene; butene-1 or butene-2 to a mixture of butadiene-1,3 and vinyl acetylene; n-pentane to a mixture of pentadiene-1,3 and 1-penten-3-yne; 2-methyl butane or 2-methyl-1-butene to a mixture of isoprene and 2-methyl-1-buten-3-yne; and 2-methyl-1-pentene or 2-methyl-2-pentene to 2-methyl-1,3-butadiene and 2-methyl-1-buten-3-yne.

The manner of mixing the halogen or halogen compound, hydrocarbon feed, oxygen containing gas and steam, if employed, is subject to some choice. In normal operations the hydrocarbon feed may be preheated and mixed with steam and preheated oxygen or air and halogen or hydrogen halide are mixed therewith prior to contacting with the catalyst bed. Hydrogen halide or a source of halogen may be dissolved in water and may be mixed with steam or air prior to reaction. The effluent reaction product from the reactor is cooled and then is passed to means for removing halogen or halogen compounds and the hydrocarbon product is then suitably purified as by fractionation or extractive distillation to obtain the desired high purity product.

In the following examples will be found specific embodiments of the invention and details employed in the practice of the invention. Percent conversion represents mol of hydrocarbon feed consumed per 100 mols of hydrocarbon fed to the reactor and percent selectivity represents the mols of the indicated product formed per 100 mols of hydrocarbon feed consumed. These examples are intended as illustrative only since numerous modifications and variations in accordance with the disclosure herein will be apparent to those skilled in the art. Other percentages are by weight.

EXAMPLE 1

Vinyl acetylene is produced from $C_4$ hydrocarbons by oxidative dehydrogenation with a bromine cocatalyst containing Fe, Mg, Ca and Mo. A slurry containing 93 percent magnesium ferrite, 5 percent calcium oxide and 2 percent molybdic acid is dried at 120° C. overnight in an open air oven. The dried cake is then crushed and screened through a 40 mesh sieve and tabletted. A tubular Vycor reactor which is 25 mm in internal diameter and 26 inches in length is used. The reactor is filled with 125 cc of the tabletted catalyst. The depth of the catalyst in the reactor is 9 inches. On top of the catalyst is placed 12 inches of 6mm x 6mm Vycor Raschig rings to form a preheat section. The Vycor reactor is surrounded by a 24 inch in length electric furnace. The electric furnace covered the portion of the reactor containing the catalyst and also the preheat zone.

The hydrocarbon feed is butene-2 at 1.5 LHSV (liquid hourly space velocity) and an 800° F. inlet, 1.25 oxygen (fed as air) to hydrocarbon ratio and 0.2 bromine (fed as H Br) to hydrocarbon ratio and 20/1 steam to hydrocarbon ratio. The bromine is added as an aqueous solution of H Br prepared by diluting 0.35 cc 48.3 percent H Br with 1.0cc distilled $H_2O$.

A mixture of butene-2, steam, oxygen and bromine is fed to the top of the reactor. The oxygen is added as air. The butene-2 used is approximately 95 percent purity with the remainder being butene-1 together with minor amounts of n-butane and 1-3 butadiene. The required amounts of water and H Br solution are fed as liquid and the steam is formed in a separate preheated section controlled by electric heaters. The air and butene are then mixed with the steam and H Br and fed to the reactor.

The conversion of butene-2 is 99.5 percent with the selectivity to butadiene being 70.0 percent and the selectivity to vinyl acetylene being 14.0 percent for a total selectivity of 84.0 percent.

EXAMPLES 2 THROUGH 13

The procedure of Example 1 is repeated with the noted exceptions in the table. In all of these examples 100 percent conversion was achieved. Example 2 is a comparative run to illustrate the effect of omitting the molybdenum from the catalyst.

n-butene, said process comprising reacting said n-butene with oxygen and a halogen in the presence of a catalyst composition comprising Fe, O, Mo and A wherein A is selected from the group consisting of calcium, magnesium, strontium, barium or mixtures thereof and the molar ratio of Fe/Mo/A in said catalyst composition is $1/y/x$ wherein $x$ is from 0.01 to 0.5 and $y$ is from 0.001 to 0.1.

2. The method of claim 1 wherein said catalyst composition comprises Fe, Mg, Ca, Mo and O wherein the molar ratio of Fe/Mg/Ca/Mo in said catalyst composition is $1/a/b/y$ wherein $a$ is from 0.02 to 0.5, $b$ is from 0.01 to 0.4 and $y$ is from 0.001 to 0.1

3. The method of claim 2 wherein $a$ is from 0.2 to 0.25, $b$ is from 0.05 to 0.08 and $y$ is from 0.003 to 0.03.

4. The method of claim 1 wherein A is calcium.

5. The method of claim 1 wherein the said halogen is bromine.

6. The method of claim 1 wherein the incorporated catalyst is formed by using molybdic acid as the source of molybdenum.

TABLE

| Example number | Active surface | Mols $O_2$/Hcbn. | Mols Hal. Hcbn. | Mols $H_2O$/Hcbn. | Temperature, °F. | | Yield | | |
|---|---|---|---|---|---|---|---|---|---|
| | | | | | In | Out | Butadiene | Vinyl acetylene | Total |
| 2 | 75% $Fe_2O_3$; 5% CaO, 20% MgO | 1.0 | .16 | 14 | 810 | 1,400 | 50 | 12.7 | 62.7 |
| 3 | 72% $Fe_2O_3$, 5% CaO, 20% MgO, 3% $H_2MoO_4 \cdot H_2O$ | 1.3 | .13 | 16 | 750 | 1,340 | 57.0 | 14.8 | 71.8 |
| 4 | Same as Example 3 | 1.0 | .12 | 16 | 780 | 1,300 | 62.5 | 12.7 | 75.2 |
| 5 | 73% $Fe_2O_3$, 5% CaO, 20% MgO, 2% $H_2MoO_4 \cdot H_2O$ | 1.28 | .20 | 16 | 890 | 1,300 | 60.2 | 11.2 | 71.4 |
| 6 | 90% $Fe_2O_3$, 7% CaO, 3% $H_2MoO_4 \cdot H_2O$ | 1.25 | .20 | 16 | 830 | 1,340 | 69.7 | 12.7 | 82.4 |
| 7 | 86% $Fe_2O_3$, 6% CaO, 6% MgO, 2% $H_2MoO_4 \cdot H_2O$ | 1.24 | .20 | 16 | 840 | 1,340 | 63.8 | 14.9 | 78.7 |
| 8 | Same as Example 5 but calcined 30 minutes at 1,900° F | 1.29 | .20 | 16 | 840 | 1,350 | 67.7 | 16.4 | 84.1 |
| 9 | Same as Example 5 but calcined 30 minutes at 1,700° F | 1.24 | .20 | 16 | 880 | 1,350 | 67.4 | 15.1 | 82.5 |
| 10 | Same as Example 5 but calcined 30 minutes at 1,500° F | 1.26 | .20 | 16 | 840 | 1,340 | 68.7 | 15.7 | 84.4 |
| 11 | Same as Example 5 but uncalcined | 1.23 | .20 | 16 | 860 | 1,350 | 72.5 | 7.5 | 80.0 |
| 12 | 86% $Fe_2O_3$, 12% CaO, 2% $H_2MoO_4 \cdot H_2O$ | 1.23 | .20 | 16 | 870 | 1,350 | 78.5 | 14.2 | 92.7 |
| 13 | 93% magnesium ferrite, 5% CaO, 2% $H_2MoO_4 \cdot H_2O$ | 1.25 | .20 | 16 | 800 | 1,370 | 75.1 | 14.7 | 90.1 |

NOTE: Catalysts of Examples 2, 3, 4 and 5 were supported, remainder of examples were tableted unsupported.

We claim:

1. A process for producing vinyl acetylene and butadiene by the catalytic oxidative dehydrogenation of 7. The method of claim 1 wherein the temperature of dehydrogenation is at least 700° C.

* * * * *